United States Patent
Thorson et al.

(10) Patent No.: US 8,690,678 B2
(45) Date of Patent: Apr. 8, 2014

(54) SHAPE CONTROL OF MAGENTIC FIELDS FOR TABLE GAMES

(71) Applicant: IGT, Reno, NV (US)

(72) Inventors: Michael Ernest Thorson, Reno, NV (US); John Laurence Minck, Jr., Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 13/740,737

(22) Filed: Jan. 14, 2013

(65) Prior Publication Data

US 2013/0126602 A1    May 23, 2013

Related U.S. Application Data

(63) Continuation of application No. 12/580,559, filed on Oct. 16, 2009, now Pat. No. 8,353,759.

(51) Int. Cl.
   *A63F 13/00* (2006.01)

(52) U.S. Cl.
   USPC ....... 463/40; 340/572.1; 340/572.7; 343/841; 343/842

(58) Field of Classification Search
   USPC .......... 463/25, 40, 42; 340/572.1, 572.7; 343/841, 842; 361/818
   See application file for complete search history.

(56) References Cited

U.S. PATENT DOCUMENTS

| | | | |
|---|---|---|---|
| 5,651,548 A | 7/1997 | French et al. | |
| 7,548,213 B2 | 6/2009 | Koyama et al. | |
| 2005/0186902 A1 | 8/2005 | Lieffort et al. | |
| 2006/0044206 A1* | 3/2006 | Moskowitz et al. | 343/841 |
| 2006/0255945 A1* | 11/2006 | Egbert | 340/572.7 |
| 2007/0035399 A1 | 2/2007 | Hecht et al. | |
| 2007/0057469 A1 | 3/2007 | Grauzer et al. | |
| 2007/0095925 A1* | 5/2007 | Zhu et al. | 235/492 |
| 2008/0180250 A1 | 7/2008 | Steil | |
| 2009/0179741 A1 | 7/2009 | Hoyt et al. | |
| 2009/0179751 A1 | 7/2009 | Forster | |
| 2010/0013602 A1 | 1/2010 | Hoyt et al. | |
| 2010/0014270 A1* | 1/2010 | Liu | 361/818 |

FOREIGN PATENT DOCUMENTS

| | | |
|---|---|---|
| EP | 0 693 733 A1 | 1/1996 |
| EP | 1 475 744 A1 | 11/2004 |
| WO | WO-2007/030862 A1 | 3/2007 |

OTHER PUBLICATIONS

Combined Search and Examination Report for GB 1016777.3, dated Feb. 14, 2013.

* cited by examiner

*Primary Examiner* — James S McClellan
(74) *Attorney, Agent, or Firm* — Foley & Lardner LLP

(57) ABSTRACT

A gaming table with an upper surface that includes a gaming chip placement area and a lower surface opposite the upper surface is provided. The gaming table also includes a housing coupled to one of the upper surface and the lower surface of the gaming table, an antenna coupled to the housing, wherein the antenna is configured to form an electromagnetic field that defines a zone of communication in which a gaming chip including a radio frequency identification (RFID) tag can be read. The gaming table also includes a substantially-contiguous highly permeable magnetic material layer coupled to the antenna, the highly permeable magnetic material layer defining an outermost boundary of the zone of communication of the antenna, such that a strength of the electromagnetic field at any region beyond the defined boundary of the zone of communication is below a threshold level for communication with an RFID gaming chip, and a reading device coupled to the housing, wherein the RFID reading device is configured to read data transmitted by an RFID gaming chip when the RFID gaming chip is in the zone of communication.

19 Claims, 4 Drawing Sheets

Figure 2 – Item 100

SHAPE CONTROL OF MAGENTIC FIELDS FOR TABLE GAMES

CROSS-REFERENCE TO RELATED APPLICATIONS

This application is a Continuation application of Ser. No. 12/580,559, filed on 16 Oct. 2009, and which application is incorporated herein by reference. A claim of priority is made.

BACKGROUND OF THE INVENTION

This invention relates generally to table games, and more specifically, to using shape control of magnetic fields for table games.

Table games are an immensely popular form of gaming and can be a substantial source of revenue for gaming establishments. Known table games include poker, blackjack, craps, pai-gow, Carribean Stud, Spanish 21, and Let It Ride, for example. A table game may involve the use of, for example, one or more cards, dice, wheels, balls, tokens, and gaming chips. During a typical gaming event at a gaming table, a player places a wager on a game, whereupon winning, an award is issued to the player in the form of cash, credit, gaming chips, markers, prizes, or by other forms of payouts.

A primary concern in the administration of table games by a gaming establishment is the management and tracking of gaming chips used by players and gaming establishment personnel to denote monetary values, as well as to "cash in" players, make wagers, pay out winnings, and "cash out" players. Gaming chips typically come in varying denominations, such as, for example, $1, $5, $25, $100, $1000, and $10,000 values, although a wide variety of other denominations and currencies for gaming chips are possible. Various systems and methods of managing and tracking transactions in a gaming establishment are known that utilize radio frequency identification (RFID) tags as a way of identifying and tracking the movement of gaming chips within the gaming establishment, and specifically in the context of a gaming table. To implement such a system, an RFID tag is typically embedded within each gaming chip and RFID readers and RFID antennae are then used at a gaming table to track the gaming chips. In such systems, each gaming table typically has designated chip placement areas to enable an RFID antenna placed at each chip placement area to be used to facilitate chip reading and tracking.

However, in known RFID chip tracking systems it has been experienced that RFID antennae and readers positioned about a gaming table may detect and/or read RFID gaming chips located outside of a desired chip placement area. Specifically, depending on the size and/or shape of a magnetic field emitted from an RFID antenna, the RFID antenna and/or reader may inadvertently read chips from an adjacent placement area. This is particularly noticeable where there are a large number of RFID gaming chips spread across a gaming table and/or some of a player's gaming chips are located slightly outside of a particular chip placement area. For example, a player's gaming chips may be in front of the player, but still be outside of a designated wager chip placement area. Although such RFID gaming chips may not be subject to a current bet or wager, the RFID gaming chips may still be in a path of a magnetic field and therefore identified as being subject to a current bet or wager.

BRIEF DESCRIPTION OF THE INVENTION

The present disclosure expands on a desire of gaming establishments to more accurately track gaming activity at table games. More specifically, the present disclosure describes selectively shaping an electromagnetic field using a highly permeable magnetic material layer to facilitate improving the accuracy of reading RFID gaming chips placed on an upper surface of a gaming table.

In one embodiment, a gaming table with an upper surface that includes a gaming chip placement area and a lower surface opposite the upper surface is provided. The gaming table also includes a housing coupled to one of the upper surface and the lower surface of the gaming table, an antenna coupled to the housing, wherein the antenna is configured to form an electromagnetic field that defines a zone of communication in which a gaming chip including a radio frequency identification (RFID) tag can be read. The gaming table also includes a substantially-contiguous highly permeable magnetic material layer coupled to the antenna, the highly permeable magnetic material layer defining an outermost boundary of the zone of communication of the antenna, such that a strength of the electromagnetic field at any region beyond the defined boundary of the zone of communication is below a threshold level for communication with an RFID gaming chip, and a reading device coupled to the housing, wherein the RFID reading device is configured to read data transmitted by an RFID gaming chip when the RFID gaming chip is in the zone of communication.

In another embodiment, a system including at least one server including a memory configured to store player tracking data, and a plurality of gaming tables communicatively coupled to the at least one server via a gaming network is provided. Each gaming table includes a plurality of gaming chips including a radio frequency identification (RFID) tag, an upper surface including a plurality of gaming chip placement areas, a lower surface opposite to the upper surface, and an antenna assembly. The antenna assembly includes a housing coupled to one of the upper surface and the lower surface of the gaming table, an antenna coupled to the housing, wherein the antenna is configured to form an electromagnetic field that defines a zone of communication in which one or more of the plurality of RFID gaming chips can be read, and a substantially-contiguous highly permeable magnetic material layer coupled to the antenna, the highly permeable magnetic material layer defining an outermost boundary of the zone of communication of the antenna, such that at in any region beyond the defined boundary of the zone of communication, a strength of the electromagnetic field is below a threshold level for communication with the one or more of the plurality of RFID gaming chips, or the one or more highly permeable magnetic material layer redirects a direction of the electromagnetic field such that the electromagnetic field cannot power one or more of the plurality of RFID chips located beyond the defined boundary of the zone of communication.

In a further embodiment, a method for selectively shaping an electromagnetic field using a highly permeable magnetic material layer to facilitate improving an accuracy of reading RFID gaming chips placed on an upper surface of a gaming table is provided. The method includes providing an antenna configured to form an electromagnetic field that defines a zone of communication in which a radio frequency identification (RFID) gaming chip can be read on an upper surface of a gaming table, determining one or more directions the electromagnetic field will extend from the antenna, and forming one or more highly permeable magnetic material layers around the antenna to define an outermost boundary of the zone of communication, enabling the one or more highly permeable magnetic material layers to shape the electromagnetic field to either enable the electromagnetic field to extend in the determined one or more directions, such that at in any region beyond the defined boundary of the zone of communication, a strength of the electromagnetic field is below a threshold level for communication with an RFID gaming chip, or to enable the one or more highly permeable magnetic material layers to redirect a direction of the electromagnetic field such that the electromagnetic field cannot power a RFID chip located beyond the defined boundary of the zone of communication, and attaching the one or more highly permeable magnetic material layers to the antenna.

In a further embodiment, an antenna assembly including a housing coupled to one of an upper surface and a lower surface of a gaming table is provided. The antenna assembly also includes an antenna coupled to the housing, wherein the antenna is configured to form an electromagnetic field that defines a zone of communication in which a gaming chip including a Radio Frequency Identification (RFID) tag can be read. The antenna assembly further includes a substantially-contiguous highly permeable magnetic material layer coupled to the antenna. The highly permeable magnetic material layer defining an outermost boundary of the zone of communication of the antenna, such that a strength of the electromagnetic field at any region beyond the defined boundary of the zone of communication is below a threshold level for communication with an RFID gaming chip, or such that the highly permeable magnetic material layer redirects a direction of the electromagnetic field so that the electromagnetic field cannot power a RFID chip located beyond the defined boundary of the zone of communication, and a reading device coupled to the housing, wherein the RFID reading device is configured to read data transmitted by an RFID gaming chip when the RFID gaming chip in the zone of communication.

In a further embodiment, a gaming table is provided. The gaming table includes an upper surface that includes a gaming chip placement area, and a lower surface opposite to the upper surface. The gaming table further includes an antenna assembly that includes a housing coupled to one of the upper surface and the lower surface of said gaming table, an antenna coupled to the housing, the antenna configured to form an electromagnetic field that defines a zone of communication in which a gaming chip including a radio frequency identification (RFID) tag can be read. The antenna assembly further includes a substantially-contiguous highly permeable magnetic material layer coupled to the antenna, the highly permeable magnetic material layer defining an outermost boundary of the zone of communication of the antenna, such that the highly permeable magnetic material layer redirects a direction of the electromagnetic field such that the electromagnetic field is unable to power an RFID gaming chip at any region beyond the defined boundary of the zone of communication. The antenna assembly further includes a reading device coupled to the housing, wherein the RFID reading device is configured to read data transmitted by an RFID gaming chip when the RFID gaming chip is in the zone of communication.

BRIEF DESCRIPTION OF THE DRAWINGS

The present disclosure is described in detail below with reference to the attached drawing Figures.

DETAILED DESCRIPTION

Figure 1:
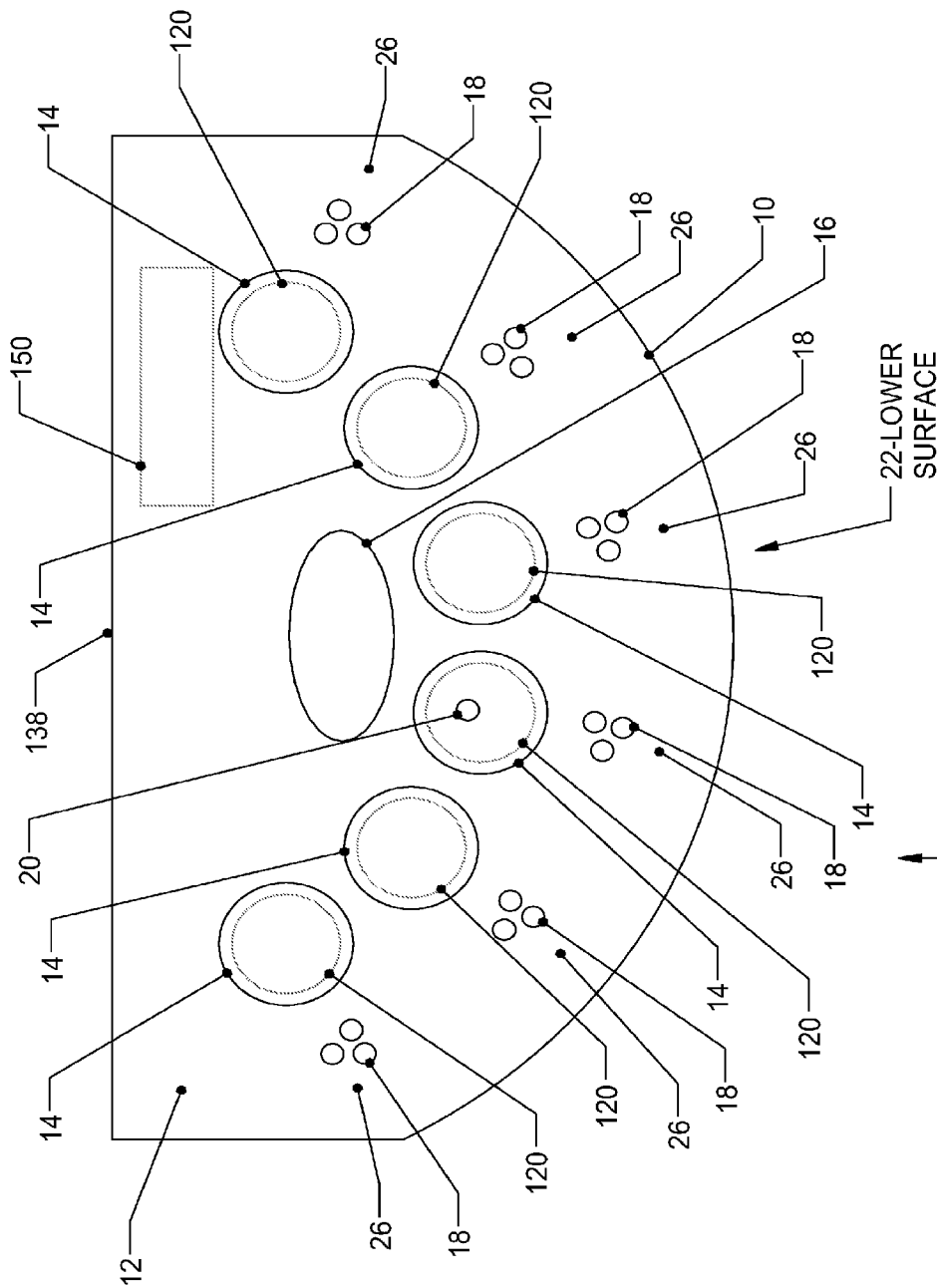
FIG. 1 is a perspective view of an exemplary gaming table.

Exemplary applications of systems, methods, and apparatus according to the present invention are described herein. These examples are provided solely to add context and to aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Technical effects of the systems, methods, and apparatus described herein include at least one of: a) providing a radio frequency identification (RFID) antenna configured to form an electromagnetic field that defines a zone of communication in which a radio frequency identification (RFID) gaming chip can be read on an upper surface of a gaming table; b) determining one or more directions that the electromagnetic field will extend from the RFID antenna to the upper surface of the gaming table; c) forming one or more highly permeable magnetic material layers around the RFID antenna to define an outermost boundary of the zone of communication; d) enabling the one or more highly permeable magnetic material layers to shape the electromagnetic field to enable the electromagnetic field to extend in the determined one or more directions, such that at in any region beyond the defined boundary of the zone of communication, a strength of the electromagnetic field is below a threshold level for communication with an RFID gaming chip, or such that a direction of magnetic field lines are redirected so that the electromagnetic field cannot power a RFID chip that is, for example, flat on the surface of the gaming table and beyond the defined boundary of the zone of communication, wherein the one or more highly permeable magnetic material layers are formed to facilitate confining the electromagnetic field within the gaming chip placement area and minimize the electromagnetic field that extends outwardly beyond an outer boundary of the gaming chip placement area; e) attaching the one or more highly permeable magnetic material layers to the RFID antenna; f) coupling the RFID antenna to a lower surface of the gaming table; and g) emitting the shaped electromagnetic field to, and above, the upper surface of the game table.

FIG. 1 illustrates an exemplary gaming table 10 illustrated in a top perspective view. Although gaming table 10 is illustrated with the general appearance of a blackjack table or table for a similarly distributed game, it will be appreciated by one of ordinary skill in the art that the gaming tables of the present disclosure, such as gaming table 10, can also be extended to other forms of gaming tables and gaming venues. For example, similar specialized gaming tables or venues can be adapted for use as a craps table, a roulette layout, and/or a sports book counter or presentation, among other suitable gaming tables or venues.

Gaming table 10 may be associated with or otherwise integrated with one or more player tracking systems (not shown), whereby gaming table 10 and/or an associated player tracking system can timely track any suitable information (e.g., table events), such as amounts wagered, game outcomes, wagering outcomes, average wager components, and/or a time these wagers are placed. The tracking of gaming events may be accomplished at gaming table 10 via a processor 42 communicatively coupled to gaming table 10. In one embodiment, processor 42 transmits and receives events, messages, commands (such as player tracking information) or any other suitable data or signals between gaming table 10 and each of the player tracking systems.

In the exemplary embodiment, a plurality of RFID gaming chips 18 are positioned on an upper surface 12 of gaming table 10. Each RFID gaming chip 18 described herein includes one or more RFID tags embedded therein. However, as is known, the presence of RFID tags within each RFID gaming chip 18 may be largely undetectable or is at least not obtrusive to the typical patron. Moreover, wireless RFID tags within gaming chips 18 can generally be passive, such that an external transponder or other device tends to deliver the RF energy needed to power the RFID tag. Alternatively, the RFID tags within gaming chips 18 can be active, such that a battery or other power source tends to be coupled to the RFID tag. Of course, other power sources or power configurations are also possible, and it is specifically contemplated that any such arrangement that may be suitable for use in a gaming chip can be used.

Each RFID tag in each RFID gaming chip 18 may include one or more functional components to be used by a table game management system, a gaming establishment chip tracking system, and/or any other suitable system within any gaming establishment where gaming chip identification or tracking may be desired. Each RFID tag may also be adapted to provide a different function or functions with respect to other RFID tags within the same gaming chip 18. For example, with a gaming chip including two embedded RFID tags, a first RFID tag may be "read-only" and dedicated to reflecting security information, the gaming chip denomination, a specific gaming chip serial number, and/or other relevant chip information. A second RFID tag may be "read-write" and thus used for changeable information, such as player tracking, gaming chip location history, and/or gaming chip transaction history, wherein information can be written, read, and rewritten. Such player tracking information might also include not only identifying information for a player, but may also include a history of transactions made by the player using the particular RFID gaming chip 18. Thus, one RFID tag could contain read-only data, while another RFID tag within the same gaming chip 18 could be a read-write RFID tag. Other RFID tags having specialty functions could also be separately embedded or otherwise contained on a single gaming chip 18. Such specialty functions could include, but are not limited to only including bonusing information, progressive jackpot information, added player tracking and "comping" data, as well as other information.

Gaming table 10 also includes one or more player stations 26 that are configured for use by a player to participate in a waging game or a game of chance offered at gaming table 10. Moreover, each player station 26 includes one of bet spots 14 wherein a player may place one or more wagers during a course of play. In other various embodiments, one or more supplemental chip placement areas 16 may be defined in one or more other locations on upper surface 12. By way of example, chip placement areas 16 may be a general cache for chips or any other chip conversion area.

Gaming table 10 also includes one or more RFID reading devices 30, one or more RFID antennas 32, and other related components, which may be located beneath gaming table 10 (e.g., coupled to or suspended from a lower surface 22 of gaming table 10) or in other non-obtrusive locations. In one embodiment, an RFID reading device and an RFID antenna can be within the same device. For example, an RFID antenna may be configured to both produce an electromagnetic field as well as receive/read information from detected RFID tags.

In the exemplary embodiments, RFID antenna 32 forms an electromagnetic field that defines a zone of communication (not shown in FIG. 1) in which an RFID gaming chip (e.g., RFID gaming chips 18) can be read. For example, to distinguish between individual gaming table events, gaming table 10 is separated into a plurality of detection zones 120 (e.g., an area in which energy emitted by an RFID antenna energizes detectable identification of RFID gaming chips 18). One or more RFID antenna 32 may be placed at each detection zone 120 to facilitate RFID gaming chip reading and tracking.

Figure 4:
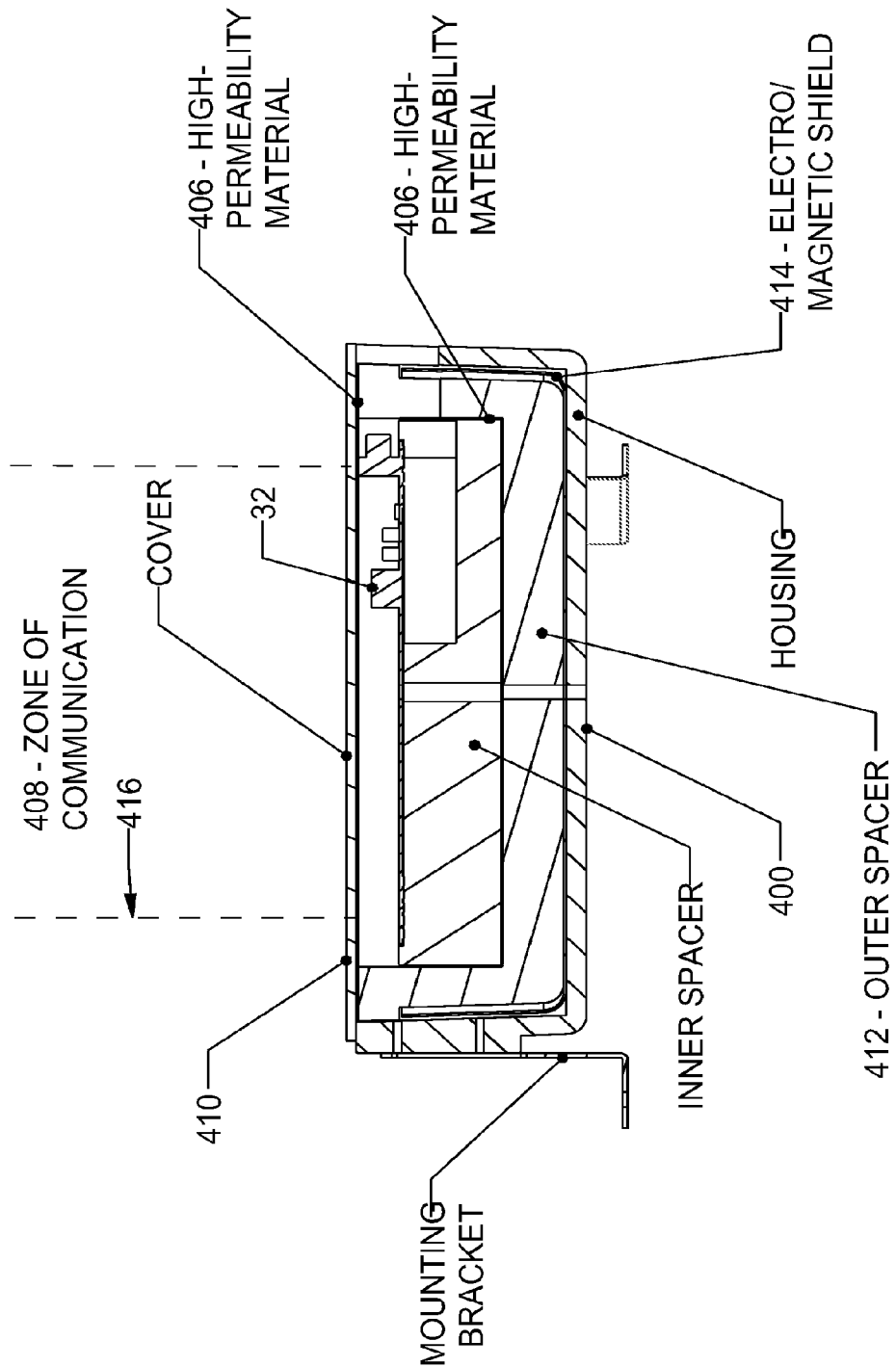
FIG. 4 is a perspective diagram illustrating a side view in which an RFID antenna is coupled to a lower surface of a gaming table.

As shown in FIG. 1, each detection zone 120 overlaps or is confined within each of bet spots 14. As such, if RFID gaming chip 18 is placed within a bet spot 14, and another RFID gaming chip 18 is placed outside of one of the bet spots 14, only the RFID gaming chip 18 positioned within one of the bet spots 14 is properly identified as a bet. For example, a first RFID gaming chip 20, worth $10, may be subject to a current wager in a first bet spot 14, while other gaming chips 18 are merely located on gaming table upper surface 12 and are not subject to a current play or action at the gaming table 10. To ensure that a strength of an electromagnetic field emitted by an RFID antenna (e.g., the RFID antenna 32) at any region beyond a defined boundary (e.g., a defined bet spot) is below a threshold level for communication with an RFID gaming chip 18, each electromagnetic field is shaped via a highly permeable magnetic material layer (e.g., highly permeable magnetic material layer 406 as shown in FIG. 4) coupled to RFID antenna 32. For example, in one embodiment, a highly permeable magnetic material layer is attached to RFID antenna 32 such that the highly permeable magnetic material layer defines an outermost boundary of a zone of communication for that specific RFID antenna 32. In each embodiment, the highly permeable magnetic material layer is a layer that can carry more magnetic field than air. For example, the highly permeable magnetic material layer allows about 30 times or more of the magnetic field to exist inside the magnetic material layer than outside the magnetic material layer (in the air). Generally, a thickness (not shown) of the highly permeable magnetic material layer is variably selected based on the magnitude of the magnetic field being carried, and on the permeability of the highly permeable magnetic material layer itself.

In the exemplary embodiment, one or more RFID antennae 32 (FIG. 4), and each associated RFID reading device 30 (FIG. 1), are coupled to gaming table lower surface 22 (FIG. 4), directly below each defined bet spot 14. As such, a highly permeable magnetic material layer is formed to shape the electromagnetic field emitted by RFID antenna 32 to extend in a direction that is substantially perpendicular to RFID antenna 32, preventing the perpendicular electromagnetic field from extending over the highly permeable magnetic material layer. Thus, the shaped electromagnetic field defines a zone of communication that extends to, and above, gaming table upper surface 12. Moreover, the zone of communication has a surface area 120 at gaming table upper surface 12 equal to or less than a surface area of a gaming chip placement area (e.g., bet spot 14) on gaming table upper surface 12.

Operation of each RFID antenna associated with other chip placement areas occurs as described above. For example, an RFID antenna associated with a dealer may also be provided with an associated detection zone. One of ordinary skill in the art will appreciate that any number of RFID antennae, chip placement areas, and corresponding detection zones associated with gaming table 10 are within the scope of the present disclosure. For example, in one embodiment, an RFID gaming chip tray (not shown) may also be provided. The RFID gaming chip tray allows further tracking of incoming and outgoing RFID gaming chips 18. For example, if RFID gaming chips 18 have been purchased by a player but have not passed through the RFID gaming chip tray, the purchased RFID gaming chips 18 may be assumed to have left with, or been kept by, the player. Further, RFID gaming chips 18 that are presented for play on gaming table 10 that do not pass through the RFID gaming chip tray may be assumed to have been brought to gaming table 10 by the player.

In the exemplary embodiment, a dealer position 138 is located generally opposite one or more of player positions 26. As is generally understood, the dealer presents the game from dealer station 138. A dealer interface 150 may also be positioned near dealer position 138. Dealer interface 150 includes a user interface that enables the dealer to provide input to a detection system (not shown) and that optionally receives input from the detection system. In various embodiments, dealer interface 150 includes one or more buttons, dials, display screens, lights or other illumination devices, speakers or other audible indicators, analog dials, potentiometers, or keypads.

Through use of dealer interface 150, the dealer is able to provide input to the detection system or receive data from the detection system. The dealer interface 150 may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, dealer interface 150 includes a touch-screen with an associated touch-screen controller. Dealer interface 150 may be of any suitable size and configuration, and may include a switch configured to selectively prohibit one or more RFID reading devices 30 from reading data transmitted by a plurality of RFID gaming chips 18 when the switch is in an "off" position. One of ordinary skill in the art will appreciate that such a switch may be located directly on, or be communicatively coupled to, gaming table 10. In another embodiment, the switch may be manually activated or automatically activated via an execution/recognition of a particular event.

Figure 2:
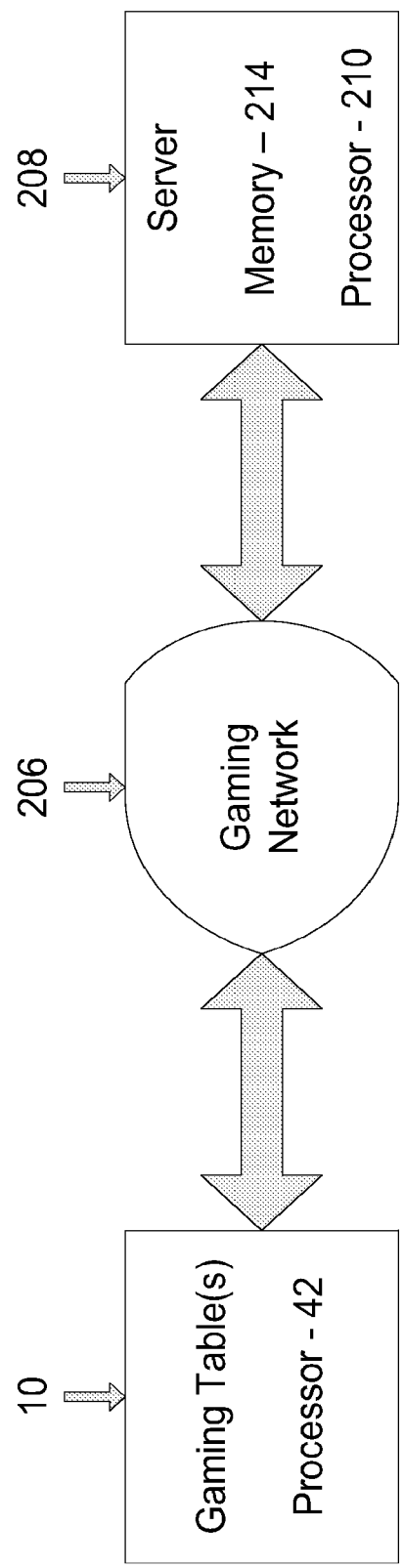
FIG. 2 is a block diagram of a plurality of gaming tables coupled in communication with a server via a gaming network.

FIG. 2, illustrates a block diagram of an exemplary gaming/detection system 100. Gaming system 100 includes a plurality of gaming tables 10 coupled in communication with a server 208 via a gaming network 206. Server 208 is any suitable server or computing device which includes at least one of a server processor 210 and at least one memory 214 or storage device. Server 208 may be a progressive controller or a processor of any of gaming tables 10 in gaming system 100. In another embodiment, processor 42 transmits and receives events, messages, commands (such as player tracking information) or any other suitable data or signal between gaming tables 10 and server 208. Processor 42 is operable to execute such communicated events, messages or commands in conjunction with the operation of gaming tables 10. Moreover, server processor 210 transmits and receives events, messages, commands (such as player tracking information) or any other suitable data or signal between server 208 and each of the individual gaming tables 10. Server processor 210 is operable to execute such communicated events, messages or commands in conjunction with the operation of server 208.

In some embodiments, a processor includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

Each gaming table 10 provides server 208 with player tracking data by providing identification and tracking of gaming chips 18 that include embedded RFID tags via RFID readers 30 and RFID antennae 32 at each gaming table 10. In one embodiment, gaming network 206 includes a real-time or on-line accounting and gaming information system that is properly coupled to server 208. The accounting and gaming information system may include a player database for storing player profiles, a player tracking module for tracking players, and/or a credit system for providing automated gaming establishment transactions.

Operation of gaming tables 10 and player tracking may be accomplished with a connection to server 208 (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or any other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

During operation, server 208 monitors one or more events at gaming tables 10, including events such as, but not limited to, bets made, games played, awards paid out, and/or tickets printed. In the exemplary embodiment, processor 42 connects to gaming network 206 which in turn may connect to server 208. In one embodiment, each gaming table 10 is connected to one processor (e.g., processor 42). In another embodiment, each gaming table 10 includes an individual processor (e.g., processor 42). Memory 214 may be used to store RFID gaming chip data, game data, control parameters, RFID data, and other data required or used by system 200 as described herein. In same embodiments, processor 42 at each gaming table 10 transmits a signal to server 208 upon each event occurrence. Alternatively, processor 42 may periodically transmit a signal to server 208, wherein the signal includes the number of occurrences of each event during a predetermined time period. Dealer interface 150 may also be connected to server 208 to thereby provide input to server 208, such as shuffle and new game data, place bets data, no bets accepted data, or any other indication signals. However, one of ordinary skill in the art will appreciate that processor 42 may also detect/transmit a signal representative of a new shuffle and new game data, place bets data, no bets accepted data, or any other indication signals.

In one embodiment, gaming tables 10 are capable of being connected together through a data network. The data network may be a local area network (LAN), in which one or more of gaming tables 10 are substantially proximate to each other and an on-site central server or controller as in, for example, a gaming establishment or a portion of a gaming establishment. In another embodiment, the data network is a wide area network (WAN) in which one or more of gaming tables 10 are in communication with at least one off-site central server or controller. In this embodiment, the plurality of gaming tables 10 may be located in a different part of the gaming establishment or within a different gaming establishment than the off-site central server or controller. Thus, the WAN may include an off-site central server or controller and an off-site gaming table 10 located within gaming establishments in the same geographic area, such as a city or state. The WAN gaming system may be substantially identical to the LAN gaming system described above, although the number of gaming tables 10 in each system may vary relative to each other.

Figure 3:
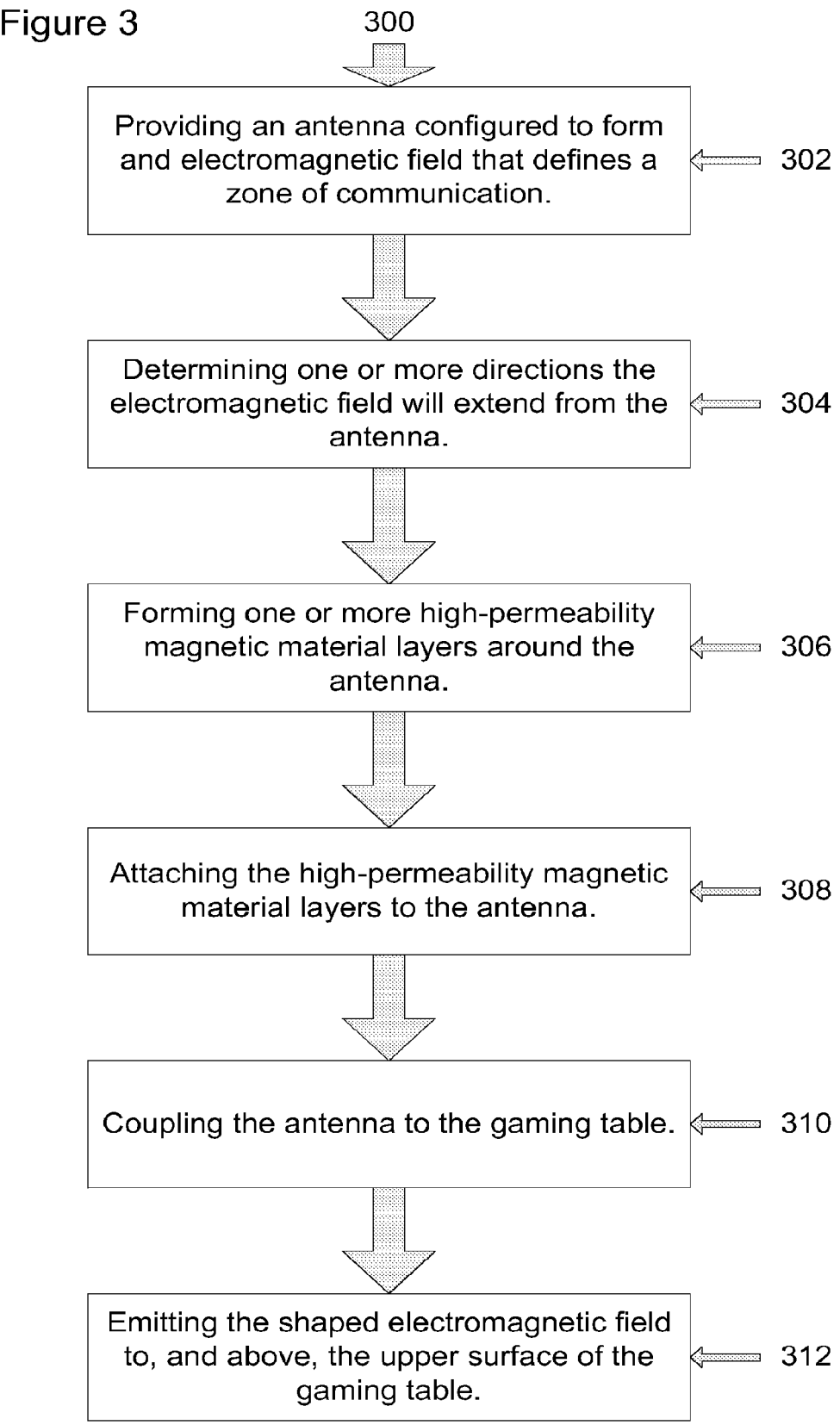
FIG. 3 is a flow diagram of an exemplary method for shaping an electromagnetic field by forming a highly permeable magnetic material layer around an RFID antenna.

FIG. 3 is a flow diagram of an exemplary method for use in shaping an electromagnetic field by forming a highly permeable magnetic material layer around an RFID antenna 32. In the exemplary embodiment, an RFID antenna, such as RFID antenna 32 is provided 302. RFID antenna 32 is configured to form an electromagnetic field that defines a zone of communication in which a plurality of RFID gaming chips on gaming table upper surface 12 can be read. Each direction that the electromagnetic field extends from RFID antenna 32 to gaming table upper surface 12 is determined 304. The direction the electromagnetic field will extend from RFID antenna 32 may be dependent upon a location of RFID antenna 32, and/or a size of the electromagnetic field desired to be emitted.

One or more highly permeable magnetic material layers are formed 306 around RFID antenna 32 to cause an outermost boundary of the zone of communication to be defined. The one or more highly permeable magnetic material layers are used to shape the electromagnetic field to enable the electromagnetic field to extend in the desired determined directions, such that in each region beyond the defined boundary of the zone of communication, a strength of the electromagnetic field is below a threshold level for communication with, for example, an RFID gaming chip 18. In one embodiment, the one or more highly permeable magnetic material layers redirect a direction of the electromagnetic field such that the electromagnetic field cannot power an RFID gaming chip 18 that is, for example, flat on gaming table upper surface 12 and located beyond the defined boundary of the zone of communication.

For example, the electromagnetic field may be shaped to extend substantially perpendicularly to RFID antenna 32. In each embodiment, the highly permeable magnetic material layers may be formed to enable the electromagnetic field to be confined within defined gaming chip placement areas, and thus, facilitate preventing the electromagnetic field from extending beyond the defined gaming chip placement areas.

As defined above, the highly permeable magnetic material layer may be a film that is magnetically permeable. Generally, a thickness of a highly permeable magnetic material layer is variably selected based on the strength of the magnetic field and the permeability of the highly permeable magnetic material layer itself.

One or more highly permeable magnetic material layers are then coupled 308 to RFID antenna 32, which is thereafter connected 310 (e.g., communicatively or physically) to gaming table 10. RFID antenna 32 is then activated to emit 312 the shaped electromagnetic field to, and above, gaming table upper surface 12, at the desired frequency. Further, because the electromagnetic field may be shaped to extend substantially in only desired directions, the electromagnetic field is capable of successfully extending a greater distance above gaming table upper surface 12, and thus enables greater amounts of RFID gaming chips 18 to be read that are stacked on top of each other.

FIG. 4 is a perspective side view of an exemplary tracking device 400 coupled to lower surface 22 of gaming table 10. Tracking device 400 includes an RFID antenna, for example, RFID antenna 32, and a highly permeable magnetic material layer 406. In one embodiment, RFID antenna 32 may be substantially planar. However, one of ordinary skill in the art will appreciate that other geometric forms, other than planar, are within the scope of the present disclosure.

In the exemplary embodiment, highly permeable magnetic material layer 406 defines an outermost boundary 416 of a zone of communication 408 that is emitted on and above gaming table upper surface 12 by RFID antenna 32. Gaming table upper surface 12 may include visual indicia that identifies the outer edges of the zone of communication 408, for example, each bet spot 14. Highly permeable magnetic material layer 406 facilitates preventing inadvertent reading of RFID tags (e.g., RFID gaming chips 18) in areas 410 beyond each defined zone of communication 408. In addition, highly permeable magnetic material layer 406 may be formed from multiple layers of highly permeable magnetic material. In one embodiment, highly permeable magnetic material layer 406 is a substantially-contiguous layer formed around RFID antenna 32. Alternatively, the highly permeable magnetic material layer 406 may be formed from multiple pieces of highly permeable magnetic material that are coupled together to form a substantially-contiguous highly permeable magnetic material layer 406. In the exemplary embodiment, tracking device 400 also includes a layer of foam 412 that extends between the highly permeable magnetic material layer 406 and a shield 414, which is, for example, made of metal. Shield 414 facilitates protecting the tracking device 400, as well as further inhibiting electromagnetic interference emitted from RFID antenna 32.

The present disclosure uses examples to disclose the best mode, and also to enable any person skilled in the art to practice the claimed subject matter, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An RFID reading device comprising:
a housing;
an antenna coupled to said housing, said antenna configured to emit an electromagnetic field that at least partially defines a zone of communication in which a radio frequency identification (RFID) tag can be read;
a highly permeable magnetic material layer coupled to said housing and proximate to the antenna, said highly permeable magnetic material layer defining an outermost boundary of the zone of communication of said antenna, and further directing the electromagnetic field so as to form a zone of communication, such that a strength of the electromagnetic field within the zone of communication enables reading of an RFID tag within the zone of communication, and the strength of the electromagnetic field at any region beyond the defined boundary of the zone of communication is below a threshold level for communication with an RFID tag; and
an RFID reader coupled to said housing, wherein said RFID reader is configured to read data transmitted by an RFID tag when said RFID tag is in the zone of communication.

2. The RFID reading device of claim 1, wherein the highly permeable magnetic material layer is positioned around three sides of the antenna.

3. The RFID reading device of claim 1, wherein the highly permeable magnetic material layer is positioned around three sides of the antenna and the zone of communication includes a volume adjacent the open side of the highly permeable magnetic material layer.

4. The RFID reading device of claim 1, wherein the highly permeable magnetic material layer is positioned around three sides of the antenna and the zone of communication includes a volume adjacent the open side of the highly permeable magnetic material layer, the electromagnetic field associated with the zone of communication having sufficient strength to extend through a surface traversing the zone of communication.

5. The RFID reading device of claim 1, wherein the surface traversing the zone of communication is non-magnetic.

6. The RFID reading device of claim 1, wherein the highly permeable magnetic material layer further comprises a plurality of layers of material.

7. The RFID reading device of claim 1, further comprising an electromagnetic shield, the highly permeable magnetic material layer positioned the antenna and the electromagnetic shield.

8. The RFID reading device of claim 1, wherein said highly permeable magnetic material layer shapes the electromagnetic field to extend substantially in a direction perpendicular to said antenna.

9. The RFID reading device of claim 1, wherein said highly permeable magnetic material layer redirects a direction of the electromagnetic field such that the electromagnetic field cannot power a RFID chip located beyond the defined boundary of the zone of communication.

10. The RFID reading device of claim 1, wherein said antenna has a substantially planar form.

11. A system comprising:
at least one server comprising a memory configured to store tracking data for a plurality of RFID (radio frequency identification) tags; and
a plurality of locations communicatively coupled to said at least one server via a network, at least some of the locations comprising:
an RFID reading device positioned to read RFID tags in a zone of communication of the RFID reading device, the RFID reading device including:
a housing;
an antenna coupled to said housing, said antenna configured to emit an electromagnetic field that at least partially defines the zone of communication in which a radio frequency identification (RFID) tag can be read;
a highly permeable magnetic material layer coupled to said housing and proximate to the antenna, said highly permeable magnetic material layer defining an outermost boundary of the zone of communication of said antenna, and further directing the electromagnetic field so as to form the zone of communication, such that a strength of the electromagnetic field within the zone of communication enables reading of an RFID tag within the zone of communication, and the strength of the electromagnetic field at any region beyond the defined boundary of the zone of communication is below a threshold level for communication with an RFID tag; and
a reader coupled to said housing, wherein said RFID reader is configured to read data transmitted by an RFID tag when said RFID tag is in the zone of communication, said RFID reading device communicating to the at least one server that a particular of RFID (radio frequency identification) tag was or is in the zone of communication of the RFID reading device.

12. The system of claim 11, wherein a location of the RFID reading device and identifying information associated with a read RFID tag are stored in the memory of the at least one server.

13. The system of claim 11, wherein a location of the RFID reading device, a time the RFID is in a zone of communication, and identifying information associated with a read RFID tag are stored in the memory of the at least one server.

14. The system of claim 11, wherein placement of the RFID reading device is adjustable to adjust the placement of the zone of communication.

15. The system of claim 11, further comprising a switch configured to prohibit at least one of said plurality of RFID reading devices to read data transmitted by said plurality of RFID tags when said switch is in an off position.

16. The system of claim 11, further comprising a processor in communication with said plurality of RFID reading devices, said processor configured to process and manipulate data sent from said plurality of RFID reading devices.

17. The system in accordance with claim 11, wherein the highly permeable magnetic material layer shapes the electromagnetic field to extend substantially in a direction parallel to at least some surfaces of the highly permeable magnetic material layer.

18. The system in accordance with claim 11, wherein the RFID reading device can be configured with one of a plurality of antennas and one of a plurality highly permeable magnetic material layer shapes to produce different shapes of the zone of communication.

19. An antenna assembly comprising:
a housing coupled to one of a surface at a location;
an antenna coupled to said housing, said antenna configured to form an electromagnetic field that defines a zone of communication in which a radio frequency identification (RFID) tag can be read;
a substantially-contiguous highly permeable magnetic material layer coupled to said antenna, said highly permeable magnetic material layer defining an outermost boundary of the zone of communication of said antenna, such that a strength of the electromagnetic field at any region beyond the defined boundary of the zone of communication is below a threshold level for communication with an RFID gaming chip, or such that said highly permeable magnetic material layer redirects a direction of the electromagnetic field so that the electromagnetic field cannot power a RFID chip located beyond the defined boundary of the zone of communication; and a reading device coupled to the housing, wherein the RFID reading device is configured to read data transmitted by an RFID tag when the RFID tag in the zone of communication.

* * * * *